(12) United States Patent
Asgeirsson (10) Patent No.: US 6,321,135 B1
(45) Date of Patent: Nov. 20, 2001

(54) BATCHING OF OBJECTS

(75) Inventor: Agni Asgeirsson, Kopavogur (IS)

(73) Assignee: Marel HF, Reykjavik (IS)

( * ) Notice: Subject to any disclaimer, the term of this patent is extended or adjusted under 35 U.S.C. 154(b) by 0 days.

(21) Appl. No.: 09/624,775

(22) Filed: Jul. 25, 2000

(30) Foreign Application Priority Data

Jul. 27, 1999 (IS) .......................................... 5136

(51) Int. Cl.$^7$ .................................................. G06F 7/00
(52) U.S. Cl. ........................ 700/213; 198/358; 198/418.1
(58) Field of Search ..................... 700/213, 33; 198/358, 198/370.07, 418.1

(56) References Cited

U.S. PATENT DOCUMENTS

| 4,122,941 | * | 10/1978 | Giles et al. | ........................ | 198/418.1 |
| 4,442,932 | * | 4/1984 | Sashiki et al. | .................... | 198/418.1 |
| 4,564,103 | * | 1/1986 | Sashiki et al. | .................... | 198/418.1 |

* cited by examiner

Primary Examiner—Christopher P. Ellis
Assistant Examiner—Khoi H. Tran
(74) Attorney, Agent, or Firm—Pillsbury Winthrop LLP (57) ABSTRACT

A prospect is generated for filling a batch with at least one item having at least one characteristic property. The prospect is used to assign an item to a batch having at least one batch shortage expressed in terms of the at least one characteristic property. A first set of data representing at least one characteristic property of at least one item is provided. A second set of data is provided, representing at least one batch shortage. A third set of data is generated, representing a tally on the number of combinations of the items represented in the first set of data as a function of batch shortage and item count. A fourth set of data is provided indicating at least one batch shortage and optionally a maximum number of items on which the prospect generation is to be based. The prospect related to the fourth set of data is generated on the basis of multiplying each of the entries of the third set of data by the single count probability corresponding to each entry, subject to the proviso that each of the entries multiplied represents: (i) one of the batch shortages indicated in the fourth set of data, and (ii) a number of combinations of items being smaller than or equal to the provided maximum number of items.

22 Claims, 4 Drawing Sheets

BATCHING OF OBJECTS

CROSS-REFERENCE TO RELATED APPLICATIONS

This application claims priority under 35 U.S.C. §119 from Icelandic Patent Application No. 5136, titled "Batching of Objects" and filed Jul. 27, 1999, the contents of which are incorporated herein by reference.

BACKGROUND

1. Field of the Invention

This invention relates to batching items, e.g., based on weight or other characteristics of the items. The batching of items is sometimes referred to as "the on-line bin-packing problem." More specifically, this invention relates to the problem of accumulation of non-uniform items forming a best possible uniformity of the accumulated batch.

2. Background

In various industries, basic items are sold in batches satisfying various constraints. For example, many food items (such as, e.g., fresh or frozen fish portions, chicken portions and the like) are sold in prepackaged batches having a predetermined weight and/or number of pieces, within given tolerances. The tolerances may be quite strict in some industries.

Batching has developed as a result of contracts between sellers and purchasers for delivery of products which must satisfy minimum weight or other requirements. It is very important that none of the collections be below minimum weight but exceeding this weight results in an economical loss for the manufacturer, has impact on the transportation costs, taxation fees etc.

Various statistical methods have been suggested for solving the problem of reaching the batch size with as little overweight as possible. E.g., some prior art teaches the use of equations for a normal distribution or similar use of algorithms based on weight distributions. Such methods have disadvantages in that they are often difficult to apply, use large amounts of computer memory and use large computer processing resources each time an item is to be assigned to a batch.

One way to overcome the difficulties with these known methods is to omit updating all sets of data when an item is assigned to a batch. However, a major drawback of omitting updating of the sets of data is that changes in the population of items are not captured by these methods and these methods may then be based on wrong, or at least inaccurate, statistical data, whereby the batching by these methods will be less optimal.

The omission of data may have a large influence on the batching process where, for instance, the distribution of items which initially follows a normal distribution then changes and follows another distribution. Such a situation may occur if items having a special characteristic temporarily are assigned to special processing.

SUMMARY OF THE INVENTION

It is an object of the present invention to provide useful, fast and efficient methods, systems and devices for batching items, so that the processing involved in the batching will not limit the batching capacity and wherein the data used in the batching process may be updated each time an item is assigned to a batch.

The present invention is preferably based on a so-called Tally Intelligent Batching Algorithm (or Tally Algorithm). The tally is preferably the total number of possible combinations of items present in a First-In-First-Out ("FIFO") queue as a function of batch shortage and item count. This is significantly different from prior art's use of the weight distribution.

In one aspect, the present invention provides a method for generating a prospect for filling a batch with at least one item having at least one characteristic property, where the prospect is used for assigning an item to a batch having at least one batch shortage expressed in terms of the at least one characteristic property. In some embodiments, the method comprises:

(a) Providing a first set of data representing at least one characteristic property of at least one item.

(b) Providing a second set of data representing at least one batch shortage.

(c) Generating a third set of data representing a tally on the number of combinations of the items represented in the first set of data as a function of batch shortage and item count. This tally may be kept for all relevant batch shortages and numbers of items.

(d) Providing a fourth set of data indicating at least one batch shortage and an optionally maximum number of items on which the prospect generation is to be based.

(e) Generating the prospect related to the fourth set of data on the basis of multiplying each of the entries of the third set of data by the single count probability corresponding to each entry subject to the proviso that each of the entries multiplied represents one of the batch shortages indicated in the fourth set of data, and a number of combinations of items being smaller than or equal to the provided maximum number of items.

A number of terms are used which are commonly used in the batching and statistical literature. An explanation of some of the special terms and concepts relevant to the present invention are given here:

Batch:
A collection of items (may, of course, comprise only one item)

Batch Shortage:
The amount, for instance expressed in kilograms, that should be placed in a particular batch in order for that batch to fulfill a predetermined batch size.

Batch Size:
The amount, for instance expressed in kilograms, contained in a batch.

Prospect:
Having a collection of items where each item has been assigned a characteristic property, such as the weight of the item, and at least one batch to be filled with a number of items, then by test-fitting or placing one or more items into the batch the prospect is a measure for the probability of being able to get another item or a combination of items having a characteristic property substantially equal to the batch shortage resulting from test-fitting or placing the one or more items into the batch.

Test-fitting:
Fictively placing an item in a batch.

Prospect Change:
The change in the prospect of a batch when an item is test-fitted in the batch. There are many possible ways to calculate the prospect change, the only requirement being that the prospect change is increases with the prospect of the batch with the new item test-fitted.

Number of Combinations

Having a collection of items, where each item has been assigned a characteristic property, such as the weight of the item, and a batch shortage, then counting the number of different combinations of a fixed number of items whose characteristic properties sum to the batch shortage.

Single Count Probability:

The probability of drawing a single combination of a predefined number of items from a collection of items. This is calculated by the well-known formula for binomial coefficients, and depends on the following two quantities:

(1) The number of items in the collection of items; and (2) The predefined number of items to be drawn from the bigger collection of items.

The processing (a)–(c) of the method according to the present invention relates to the generation of the Tally-matrix, and therefore may preferably not be executed each time a prospect is generated.

The batch shortage expressed in terms of at least one characteristic property may, in general, be expressed by any detectable and/or measurable unit such as grams, weight number of pieces, color etc., and combinations thereof. It is quite often preferred that, for instance, the weight of a batch and the number of items in the batch fulfill certain requirements and the present invention may, by generating a prospect for such a situation, be able to grade items so that such requirements are fulfilled.

One such situation may be described by the following example, which is only intended to assist in understanding the term "at least one batch shortage." If the present invention is applied for making batches of, e.g., 400 g, and, , if the batches are allowed 10 g of overweight and the step between batch weights is 1 g, the method may try to make 400, 401, 402 . . . 410 g batches. In such a situation, the batch requirement may include the number of items to be used, i.e., a batch may/must be of 400 g (–0 g; +10 g) and comprise 3 (0; +1) pieces. That is, a batch must weigh between 400 g and 410 g and must comprise 3 or 4 pieces.

If a batch in such a situation weighs 390 g and comprises 2 items, the batch shortages relating to the weight may then be expressed as 400 g–390 g=10 g, 401 g–390 g=11 g, . . . 410 g–390 g=20 g, and the batch shortage relating to the number of items may be expressed as 3–2=1,4–2=2.

The first set of data is preferably representing items already assigned to a batch, i.e., when an item is assigned to a batch (or rejected) the item may be included in the first set of data. Another choice of items represented in the first set of data may be a standard population, for instance, a number of items which represent the population of items to be assigned to batches.

In process (c) above, the tally is generated and the tally preferably comprises at least one entry. Such an entry preferably represents corresponding values of:

C, i.e. a number (which might be 1) of items in a combination of items represented in the first set of data, number of combinations of C items resulting in a batch shortage represented in the second set of data, batch shortage resulting from the combination of C items.

This statement indicates that the tally may be constructed as a matrix (table). If this is the case, some number of combinations may represented either by an empty cell or a zero in case no possible combination exist.

The tally is preferably generated so that the number of items in the combination of items does not exceed a predetermined maximum number of items, whereby computer power may be saved so that the speed of the method is increased. The maximum number of items may be estimated based on requirements as to the maximum number of elements in a batch.

In a preferred embodiment of the present invention the batch shortages indicated in the fourth set of data of processing (e) are provided by test-fitting one or more items into a selected batch.

In process (e) of the method for generating a prospect, the prospect is generated related to the fourth set of data. In a situation where more than one batch shortage are indicated in the fourth set of data the intermediate prospects are preferably generated for each batch shortage and these intermediate prospects is then summed up to provide a single prospect. Other ways to evaluate a single prospect based on the intermediate prospects are, of course, within the scope of the present invention.

An example of such a situation, which is not intended to limit the invention, may be described as: "allowing batches of 400 g and 401 g with 2 to 3 items, then by summing up the intermediate prospects of getting 400 g with 2 items plus 401 g with 2 items plus 400 g with 3 items plus 401 g with 3 items may provide the prospect for that batch."

The single count probability may preferably be nested to the third set of data or may be represented in a set of data wherein information about number of items and the single count probability corresponding to the number of items is available.

In a specific embodiment of the present invention, it is preferred that the prospect is generated based on the most recently processed items, whereby at least one entry of the first set of data is removed and/or at least one entry is added to the first set of data when an item has been applied in a process of assigning an item to a batch of items. This process of assigning does not necessarily need to have as outcome an assignment of the item to a batch.

It is preferred to update the tally, i.e., generate the tally based on the new first set of data, when an entry has been removed and/or added to the first set of data, in order to have consistency between the entries of the first set of data and the tally. This update can also be done occasionally, such as periodically, which preferably may be after a predefined number of items have been added to the first set of data since the last update.

Furthermore, in an embodiment of the present invention, it is preferred to have the first set of data organized as a first-in-first-out ("FIFO") queue of entries, the queue has accordingly a first and a last entry and the last entry of this queue represents an item most recently applied in a process of assigning an item to a batch of items.

It is presently preferred that the number of entries of the first set of data is selected so that fluctuations in the prospect due to removal and/or addition of entries to the first set of data is lower than a predetermined limit and so that the prospect will be able to follow a general change in population of items, this indicates that the number of entries should be statistical significant to the population.

Typically preferred numbers of entries for the first set of data is larger than fifty (50), preferably larger than one hundred (100), even more preferably larger than one hundred and fifty (150), and, in some situations, preferably larger than two hundred (200), some larger than five hundred (500), in some situations larger than seven hundred and fifty (750) and even larger than one thousand (1,000) may be preferred.

Furthermore, it presently preferred that the third set of data is updated substantially each time an item is assigned to a batch.

In a preferred embodiment of the present invention, one entry of the first set of data is removed and one entry is added to the first set of data substantially each time an item is assigned to a batch.

In another embodiment of the present invention, no new entries are added to and/or removed from the first set of data when an item is assigned to a batch. This embodiment will provide a very fast prospect generation.

In order for the method according to the present invention to have the potential of being able to adapt to changes in the population of items and still be faster than the preferred embodiment of the invention in which all data are updated each time an item is assigned to a batch, the first set of data is updated each time an item is assigned and the derived third set of data is updated occasionally, such as periodically or each time a change such as a substantial change in population is detected, which may be each time a change which will influence the batching process is detected. In the last situation, the method according to the present invention may further comprise comparing populations at different instances and, if large changes are detected, then signaling to the method that the third set of data is to be updated.

In another aspect, the present invention relates to a method for assigning a selected item to a batch applying the prospect generation method according to the present invention. The assigning method comprises:

(a) selecting a batch and providing a first batch shortage for the selected batch;

(b) generating a first prospect for the selected batch on the basis of the first batch shortage;

(c) test-fitting the selected item into the selected batch;

(d) calculating a second batch shortage for the selected batch on the basis of the test-fitting;

(e) generating a second prospect for the selected batch on the basis of the second batch shortage; and (f) generate a change of prospect for the selected batch based on the first and the second prospect;

(g) optionally selecting another batch and repeating processes (b) through (f) until no further batches are to be selected;

(h) assigning, on the basis of the prospect change generated for each selected batch by the processes (a) through (f), the selected item to a batch fulfilling a predetermined first probability criterion, if such a batch exist among each of the selected batch.

It is presently preferred that the predetermined first probability criterion is the prospect having the highest probability change among the generated prospects, i.e., the difference between the probability of getting an item being able to close the batch evaluated after and before test-fitting of the known item. The highest probability change may have to be evaluated absolutely, i.e., negative values may have to multiplied by the factor "−1" (negative one) as the probability change may be negative.

In a situation where, for instance, the prospect states the probability to be zero or close to zero, there might be a need for a secondary assigning method, and therefore the invention, in a preferred embodiment, further comprises a secondary assigning method applied when the selected item is not assigned to a batch on the basis of the first probability criterion.

In a preferred embodiment of the secondary assigning method, this method comprises:

selecting either a batch to which the item is assigned, or leave the item without being assigned to a batch.

Preferably the batch to which the selected item is assigned by the secondary assigning method is selected on the basis of the time passed since an item was assigned to the batch. By applying such a secondary assigning method, it may be assured that no batch is forgotten. This may preferably be combined by utilizing a method wherein the batch to which the selected item is assigned by the secondary assigning method is selected on the basis of the batch characteristic being the outcome of the assignment. Furthermore, it may be preferred to combine these two methods.

In yet another preferred aspect of the methods according to the present invention, the assigning and prospect generating methods are used for assigning a selected item to a batch, wherein the selected item is selected from a stream of objects being conveyed from a first position to a second position. This second position may preferably be either a batch position or a rejection position.

In another aspect of the present invention, an apparatus is provided which is useful for assigning an item to a batch or a rejection position. The assignment takes preferably place in process where a stream of items is conveyed from a first position to a second position, which may either a batch or a rejection position, The assignment is based on the method of generating a prospect according to the present invention and according to the method of assigning an item to a batch according to the present invention.

The apparatus comprises:

means for determining the characteristic property/properties of the item to be assigned;

means for selecting either a batch or a rejection position; and means for conveying/moving the item to either the selected batch or the rejection position.

In a preferred embodiment the means for determining the characteristic property/properties comprises a controlling unit, arranged preferably in connection with a conveyer belt which may have a built-in scale.

The means for selecting either a batch or a rejection position may preferably be a part of the controlling unit and may also be stand-alone unit having a computer program being adapted to perform the steps for generating the prospect and the steps for assigning an item to a batch or a rejection position, which finally may preferably be a part of a scale.

The means for conveying/moving the item to either the selected batch or the rejection position is preferably a sorting device with a number of receiving bins. For each receiving bin a mechanical arm or similar arrangement of the sorting device can—on request from the controlling unit—direct selected items from the conveyer belt to one of the receiving bins.

Another aspect of the present invention relates to a method for filling a group of batches comprising at least one batch by assigning items being conveyed from a first position to a batch position or a rejection position by applying the assigning method according the present invention. The filling method comprising:

(a) detecting a characteristic property of an item as the item is being conveyed, (b) conveying the detected item to the batch which the item is assigned to if the item is assigned to a batch.

It may typically be advantageous to initiate the filling of a batch in way being fast and therefore a new batch/new batches comprised in the group of batches may initially filled with items without applying the assigning method according to the present invention.

In such a case the initial filling of the new batch/batches may be performed by conveying items into randomly chosen batches or by conveying items into the batch(es) in such a manner that the new batches gets initial filled within a predetermined time limit.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF PREFERRED EMBODIMENTS OF THE INVENTION

Overview

The apparatus according to the present invention can be used for packaging any kind of items where the weight of the individual pieces cannot be controlled exactly due to the nature of the items (fish, chicken pieces or similar food products are typical examples).

Figure 1:
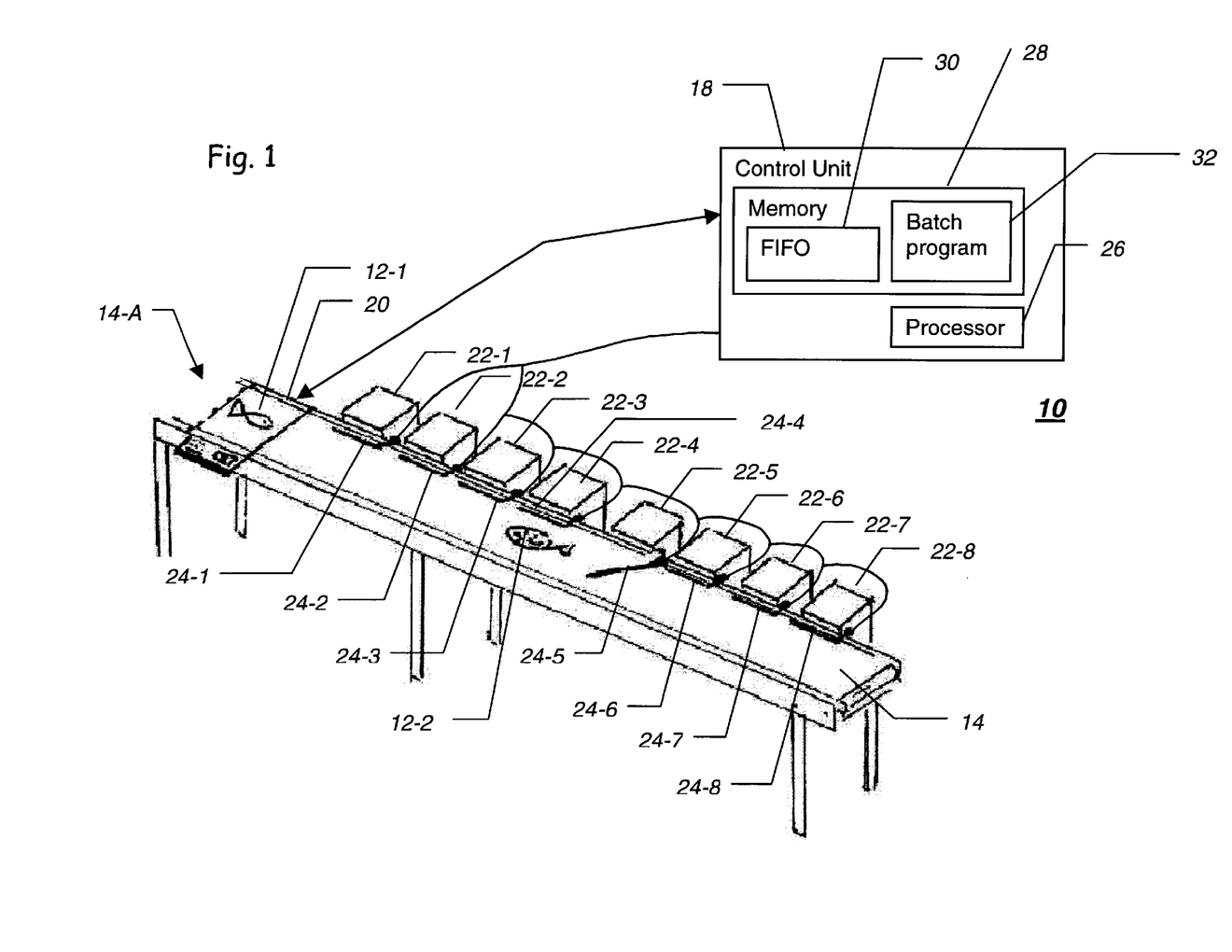
FIG. 1 shows an apparatus according to an embodiment of the present invention.

With reference to FIG. 1, this invention co-operates with an apparatus 10 for automatic transportation of items 12-1, 12-2, (collectively 12) from one place to another, for accumulating batches. The apparatus 10 includes a mechanism, preferably a conveyer belt 14, for transporting and placing the items 12. Apparatus 10 also includes a mechanism 16 for weighing or in some similar way characterizing each item 12, and a control unit 18 for controlling the accumulation process and for controlling the sorting the items 12.

The means 14 for transporting the items is, in a preferred embodiment of the invention, a conveyer belt. However, any means of transportation may be used. The items 12, e.g., portions of fish, poultry or the like, are transferred from a previous process (not shown) to the beginning of the conveyer belt (location 14-A) where they are dynamically weighed by a scale 20 placed under the conveyer belt 14 and capable of registering the weight of the individual items while the conveyer belt is moving. The scale 20 is operatively connected to the control unit 18 to provide the respective weight of each item to the control unit. Along one or both sides of the conveyer belt 14 a number of receiving bins 22-1 to 22-8 (collectively bins 22) are placed, each being equipped with a mechanical arm 24-1 to 24-8 (collectively, arms 24) for redirecting specific items passing by on the conveyer belt to the appropriate receiving bin 22. The arms 24 are operatively connected to the control unit 18 to receive signals therefrom. The control unit 18 directs each arm individually, thereby enabling the control unit to selectively direct an individual item 12 on the conveyor belt 14 into a particular receiving bin 22. For example, as shown in FIG. 1, the arm 24-5 will direct the item 12-2 into receiving bin 22-5. Each receiving bin 22 can either be emptied automatically down to another conveyer belt (not shown), transporting the combinations collected in the receiving bin to a station for packaging or each receiving bin may manually be exchanged when the preferred weight has been reached or exceeded.

The weight of each item 12 entering the conveyer belt (at 14-A) is transmitted from the scale 20 to the control unit 18. The control unit 18 may be any type of controller, including a general purpose computer. Preferably the control unit 18 includes a processing mechanism 26 for numerical and other calculations, a memory 28 for storing a queue of data representing the characteristics (e.g., the weight) of the items 12 of items on the conveyor belt 14, and a controlling mechanism for controlling the automatic transportation mechanism 10. The processing mechanism 26 can be a general purpose central processing unit (CPU) or some form of special purpose processor.

In the following description, the characteristic parameter of the items is their weight. Other measurable characteristics (e.g., surface area, volume, color etc.) are also contemplated by the present invention.

The control unit 18 may further comprise some mechanism for calculation and output of statistical information, e.g., average number of items in each receiving bin, average overweight, number of finished combinations per hour, etc. These data may be either printed on a screen or on a printer. Likewise the control unit may be connected to a LAN (Local Area Network) or similar kind of network for distribution of both statistical information as well as operations data for surveillance of the apparatus and the batching process.

The invention can also be made to operate on special purpose computer systems which include additional hardware to perform some of the more computationally intensive tasks. Similarly, while aspects of the invention can be performed by computer programs programmed for a general purpose computer, aspects of the invention can be performed using special purpose hardware.

The present invention can be implemented in software, hardware or a combination thereof. When implemented fully or partially in software, the invention can reside, permanently or temporarily, on any memory or storage medium, including but not limited to a RAM, a ROM, a disk, an ASIC, a PROM and the like. For the sake only of explanation, the batch program 32 of the present invention is shown residing in memory 28 of the control unit 18. The batch program 32 is executed by the processor 26 in a known manner. One skilled in the art would know how to have the batch program 32 reside fully or partially on other storage media.

In the control unit 18, the weight of each item 12 is stored in a First In First Out (FIFO) item-queue 30 in the memory 28. Based on the weight stored in the item-queue 30 and on a statistical selection criteria, each item is directed to one of the receiving bins 22. In order to do so, the control unit 18 tracks the position of each item in the item queue on the conveyer belt 14 and activates the appropriate mechanical arms 24 at the receiving bins 22, exactly when a given item reaches the corresponding bin. The selection of which bin 22 is to receive the item is preferably based purely on the statistical selection criteria, in a way that the probability of achieving exactly the preferred amount in each bin is highest.

The length of the conveyer belt 14 and the number of available receiving bins 22 can vary from application to application. The longer the conveyer belt and the more available bins in the actual application, the more items can be kept in the item queue 30 and the better the chances of reaching an accumulated weight of the batch which is close to the preferred minimum weight of the batch. That is, there might exist a correlation between the physical distance between the position where the characteristics of the items are derived and the position where the item is delivered, the conveyer speed and the time available for processing data.

Similarly, several conveyers can be connected to the same sorting device. The mechanical solution for transporting the items to the bins and for guiding the items into the bins can be made in various ways.

Based on the tally, a prospect for selection of a bin for a given item is generated. The prospect is a matrix containing, for each combination of items, the probability of getting the combination, in N amount of selections.

When an item has been weighed, the prospect is used in order for each individual bin to calculate the probability of arriving at the preferred weight given the present weight of the items in the bin and the weight of the new item. E.g., if one bin is short 200 grams, another bin is short 300 grams and the new item weighs 25 grams, the tally matrix is searched for item combinations giving respectively 175 grams and 275 grams, and if the combination with the highest probability gives 275 grams, the bin short 300 grams gets the new 25 gram item. If none of the bins have acceptable probability of arriving at the preferred weight given the new item, the new item may be rejected eventually for later assignment or for sale in uneven batch sizes, i.e., for ungraded sale.

As can be seen from the example, the sorting is based on the probability of getting a combination which again depends on the weight distribution.

Description of the Tally Intelligent Batching Algorithm

Summary

The Tally Intelligent Batching Algorithm according to the present invention (Tally Algorithm for short) works on a grading system that is trying to generate even batches of a predefined size (e.g., weight or length) out of a stream of items of varying sizes. This problem is well known in science literature as the on-line bin-packing problem. The input of the problem is a stream of items, and the output is a stream of finished batches and possibly a stream (smaller than the input stream) of rejected items (deemed unsuitable for the batching).

The Tally Algorithm can be summarized as follows:

A FIFO (First In First Out) queue of the most recently processed items is kept. The FIFO queue typically holds the last 100–1000 items.

The algorithm keeps a tally on the number of possible combinations of items present in the FIFO queue (the same item can only be used once) as a function of batch shortage and item count. "Batch shortage" is defined as the amount that is still needed to fill the batch.

If the batch shortage is negative, the batch has been filled, and the absolute value of the batch shortage is the amount over the batch size (i.e., the overweight). This tally is kept for all relevant batch shortages and numbers of items. The algorithms used to do this can be categorized as Dynamic Programming algorithms. If there is more than one type of item in the system, the tally needs to be kept for the relevant combinations of the different items. An example of this if there are two types of items: let (x, y) denote the tally for x items of type A and y items of type B. To make batches with 1–2 items of type A and 2 items of type B the relevant tallies to be kept are:

(1, 0), (0, 1), (2, 0), (1, 1), (1, 2), (2, 1), (1, 2) and (2, 2).

The combination tallies can either be kept constantly up to date by updating them for each item that gets added to/dropped from the FIFO queue, or they can be periodically recalculated from scratch after a significant amount of items has been added to /dropped form the FIFO queue.

By multiplying each combination tally by the probability of getting any single combination, the Tally Algorithm can calculate the prospect of that batch shortage (B) and item count (C). The resulting prospect is a number between 0 and 1 and represents the likelihood that the next C items sum exactly to B. If there are more than one item counts possible, the prospect can be summed over the possible item counts, and similarly if there are more than one possible batch shortages. E.g., the batches can be allowed to finish within a range of the target, and hence have a range of batch shortages. The prospect can also be calculated for more than one type of items by summing over different types, but it is not a simple sum anymore, but has to be weighted by the probability of each term of the sum occurring.

As the total item count (i.e., the total number of items of all items in the current tally) grows, its associated prospect can be estimated by utilizing the well known Central Limit Theorem which states that the distribution of the sum of n items tends to be more and more like the well known Gaussian distribution (sometimes called the Normal distribution) as n grows. The rate at which this distribution normalizes depends on the underlying item distributions, but in many practical cases n only has to be between five (5) and thirty (30) for this estimate to be quite good. Hence the exact tally needs only to be kept for small item counts, and the above approximation used to get the prospect for higher counts.

The Tally Algorithm matches each new item to all the available batches, and calculates the change of each batch's prospect. The item is put into the batch that has the best prospect change, unless rejection is allowed (a rejected item is not put into any batch), and the best prospect change is too low to satisfy the acceptance criteria, If the chosen batch becomes full, it is released and a new empty one gets started instead.

The algorithm also tracks the age of each unfinished batch, and ensures that none of them is forgotten. All batches get finished within a reasonable amount of time.

Description

The Tally Algorithm will be described in more detail with flow charts (see FIGS. 2–4) and the following pseudo-code listings. A sample Tally matrix is also included as an example. The Tally algorithm and other algorithms according to the present invention are implemented and run on the processing unit 26 of the controller 18. The main algorithm loop is described with reference to the flowchart of FIG. 2, with references to the other charts and code listings.

Figure 2:
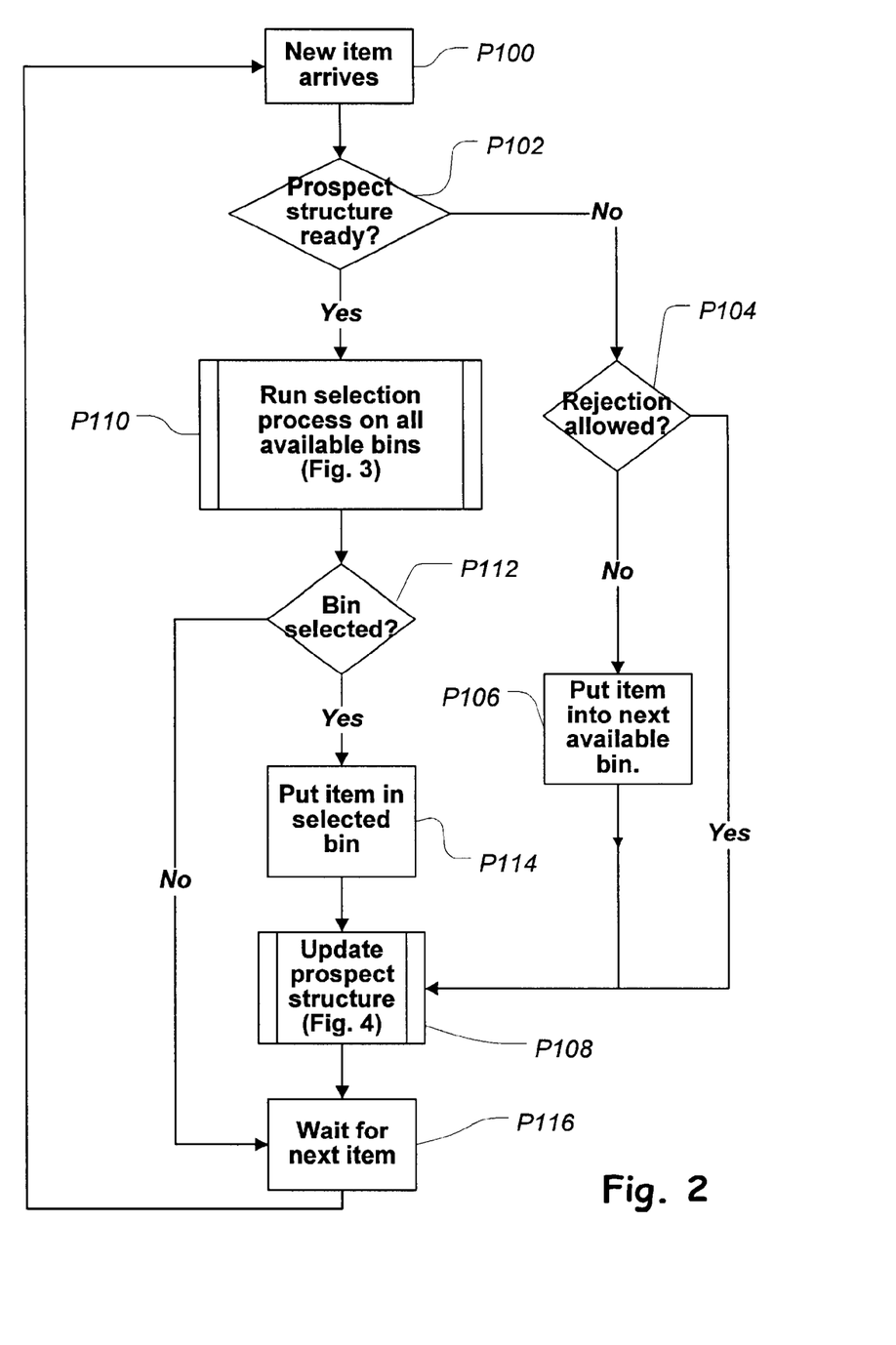
FIGS. 2–4 are flowcharts depicting the processing according to an embodiment of the present invention.

As each item arrives (P100), the control unit 18 determines (at P102) whether or not the prospect structure is ready. If the prospect structure is not ready, the control unit 18 then determines (at P104) whether or not rejection is allowed. If it is determined that rejection is not allowed, then the item is put into the next available receiving bin (at P106) and the prospect structure is updated (at P108). On the other hand, if it is determined (at P104) that rejection is allowed, then the prospect structure is updated (at P108).

Figure 3:
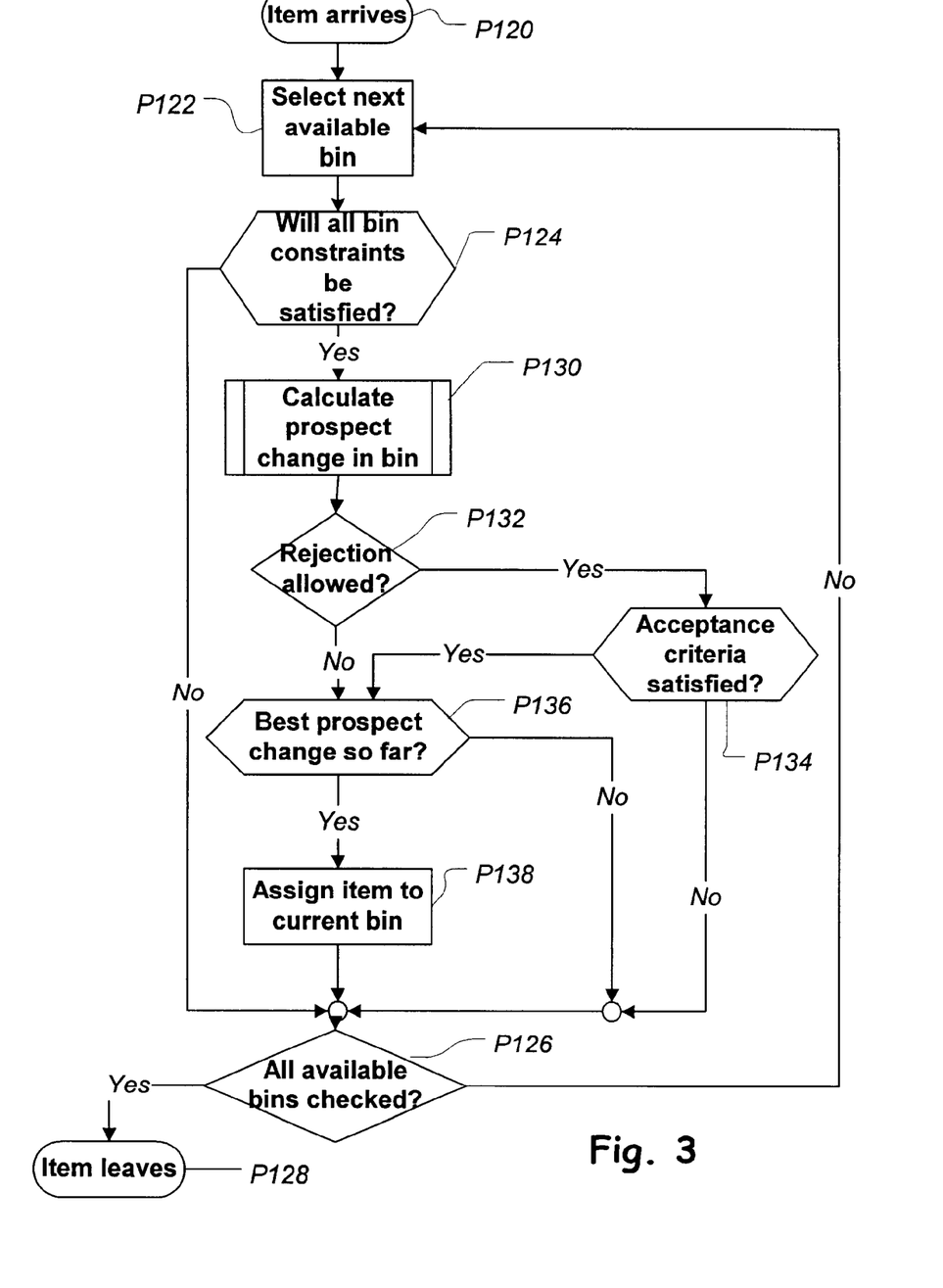

If it is determined (at P102) that the prospect structure is ready, then the selection process is run on all available bins (P110 and FIG. 3). After running the selection process on all available bins (at P110), it is determined whether or not a bin was selected (at P112). If it is determined that no bin was selected, the process waits for the next item (at P116).

Figure 4:
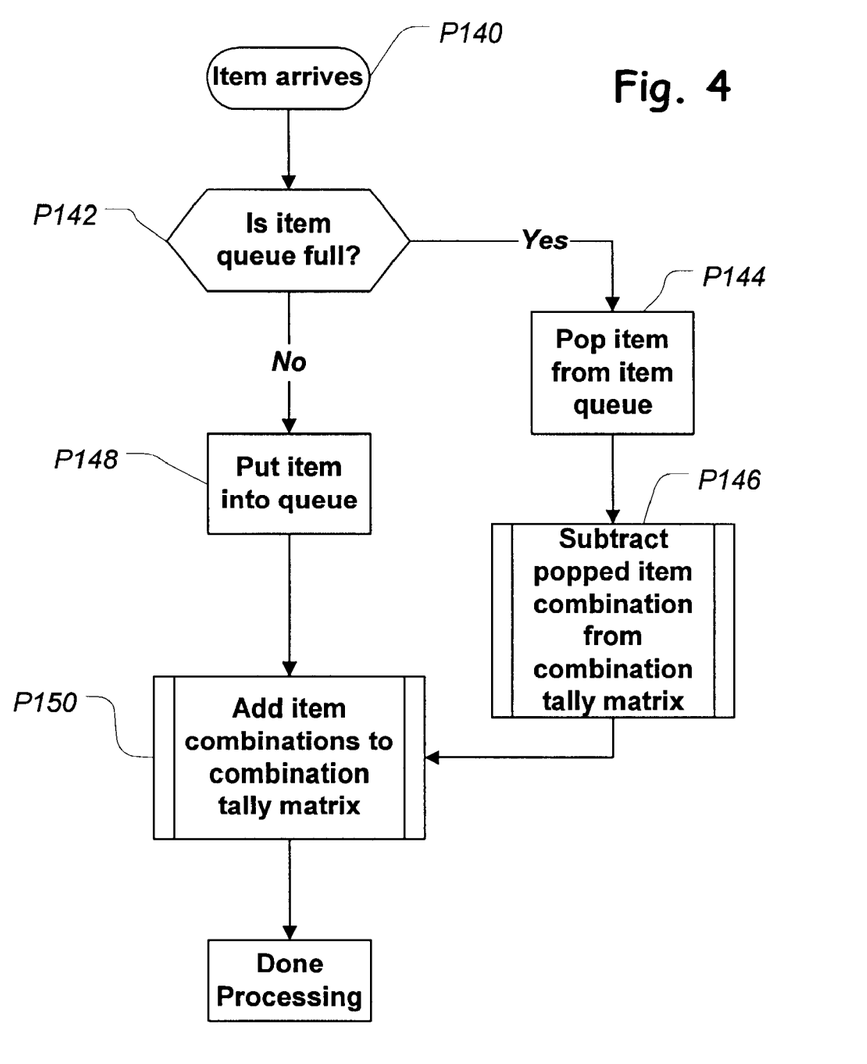

On the other hand, if a bin was selected, the item is put into the bin (at P114) (e.g., by controlling the appropriate arm 24-1–24-8), and the prospect structure is updated (at P108 and FIG. 4). Then the process waits for the next item (at P116).

The selection process (P110 of FIG. 2) is described with reference to the flowchart of FIG. 3. When an item arrives (at P120), the next available bin is selected (at P122), and then it is determined (at P124) whether or not all constraints will be satisfied. If it is determined that all constraints will not be satisfied, then it is determined whether or not all available bins have been checked (at P126). If no available bins remain, the item leaves (at P128), otherwise the next available bin is selected (at P122) and processing continues.

On the other hand, if it is determined (at P124) that all constraints will be satisfied by the present bin selection, the prospect change for that bin is calculated (at P130) (as described below). Next it is determined (at P132) whether or not rejection is allowed. If rejection is allowed, then it is determined (at P134) whether or not the acceptance criteria have been satisfied.

If the acceptance criteria have not been satisfied, then the next available bin (if one is available (determined at P126)) is selected (at P122), otherwise the item leaves (at P128). On the other hand, if the acceptance criteria have been satisfied (determined at P134), then it is determined (at P136) whether or not this is the best prospect change so far. If so, the item is assigned to the current bin (at P138), otherwise processing continues with the next available bin, if one exists.

The prospect comparison calculation (processed at P130) is as follows:

Pseudo-code #1. Prospect Comparison Calculation for one Item Type.

Input:

Size of item, w

Batch shortage, b

Items in batch, c

Current batch prospect, cbp

Minimum and maximum number of items in batch, min_c and max_c

Maximum allowed overweight, z

Batch finish evaluation function, BFE(b, c z{other parameters if needed}) This function returns a positive number if the given batch shortage and count satisfies all batch constraints (i.e., the batch is finished), else it returns Zero. The positive number returned can be viewed as the quality of the batch finish, and is used as the prospect of a finished batch. A simple example of a BFE function is a uniform function that returns 1 if the batch shortage is between −t and 0 (the t is then the maximum oversize allowed), and the count is between min_c and max_c, if not it returns 0.

Number of items in FIFO queue, n

Tally matrix, $TM_{i,j}$

Prospect comparison function, PCF(p2,p1,{other parameters if needed}) This function returns a measure on the different of the two prospects p1 and p2. There are many possible ways to do this, the only requirement is that the function should be monotonically increasing with p2. Subtraction, p2-p1, is an example of a simple PCF function.

In the following code, the function MAX(a, b) returns the larger of the two numbers a and b, the function MIN(a, b) returns the smaller of the two numbers a and b, and $$\binom{n}{k} = \frac{\prod_{i=n-k+1}^{n} i}{\prod_{j=i}^{k} j},$$

i.e., a binomial coefficient.

Output:

Prospect change, pc
   pc=ProspectCompare(w, b, C, cbp, min_c, max_c, z, n, $TM_{i,j}$) begin
   nb=b−w; {The batch shortage after the new item has been added}
   c0=MAX(1, min_c−c−1); {The minimum number of items needed}
   c1=max_c−c−1; {The maximum number of items that can be used}
   if BFE(nb, c−1)>0 then {The batch is filled}
      p=BFE(nb, c−1, z);
   else if nb>0 then {The batch is not yet filled}

$$p = \sum_{i=nb}^{nb+t} \sum_{j=c0}^{c1} BFE(nb-i, c+j, t)TM_{i,j} * \binom{n}{i}^{-1};$$

else {The batch will not be finished within all constraints with the current piece}
      p=0;
   pc=PCF(p, cbp);
   return pc; end.

Pseudo-code #1. Prospect Comparison Calculation, Many Types of Items.

Input:

Size of item, w

Type of item, t

Batch shortage, b

Number of types, T

Relative frequencies of the items of different T types, F=[$f_1$, $f_2$ . . . , $f_T$], i.e., if 25% of items are of type 2, $f_2$=0.25.

Batch count c, a vector with one entry for each type, c=[$c_1$, $c_2$, . . . , $c_T$], where each entry is the count of number of pieces of that type.

Current batch prospect, cbp

Minimum and maximum number of items in batch by each type (vectors),
min_c=[min_$c_1$, min_$c_2$, . . . , min_$c_T$] and
max_c=[max_$c_1$, max_$c_2$, . . . , max_$c_T$]

Maximum allowed overweight, z

Batch finish evaluation function, BFE(b, c, z, {other parameters if needed})

Number of items in FIFO queue, n

Tally matrix, $TM_{i,j}$. Note that here that the subscript j is a vector with one entry for each item type.

Prospect comparison function,
   PCF(p2, p1, {other parameters if needed})

Output:

Prospect change, pc
   pc=ProspectCompare(w, b, c, cbp, min_c, max_c, t, n, $TM_{i,j}$) begin
   nb=b−w; {The batch shortage after the new item has been added}

$$\tilde{c} = \begin{cases} c_j, & \text{if } j \neq t \\ c_j - 1, & \text{if } j = t; \end{cases}$$

{Resulting batch count if the item is added}

$$c0 = \begin{cases} \text{MAX}(1, \min\_c_j - c_j), & \text{if } j \neq t \\ \text{MAX}(1, \min\_c_j - c_j - 1), & \text{if } j = t; \end{cases}$$

{Min no. of items needed}

$$c1 = \begin{cases} \max\_c_j - c_j, & \text{if } j \neq t \\ \maxn\_c_j - c_j - 1, & \text{if } j = t; \end{cases}$$

{Max no of items that can be used}
if BFE(nb, $\tilde{c}$, z)>0 then {The batch is filled}
  p=BFE(nb, $\tilde{c}$, z);
else if nb>0 then {The batch is not yet filled}
  p=0;
  for $\hat{c}$=c0 to c1 do begin
    {This loop runs through all combinations of $\hat{c}$ between c0 and c1, for all $\hat{c}$ such that each individual entry is between, or equal to, the corresponding entries of c0 and c1, or $c0_j \leq \hat{c}_j \leq c1_j$ for all $1 \leq j \leq T$.}

$$\sum \hat{c} = \sum_{i=1}^{T} \hat{c}_j$$

$$p = p + \sum_{i=nb}^{nb+t} \left[ \left( BFE(nb-i, c+\hat{c}, t)TM_{i,\hat{c}} \Big/ \binom{n}{\sum \hat{c}} \right) * \left( \sum \hat{c}! * \prod_{j=1}^{T} \left( \frac{f_j^{\hat{c}_j}}{\hat{c}_j!} \right) \right) \right]$$

;

$$\left\{ k! = \prod_{j=1}^{k} j. \right\}$$

end
  else {The batch will not be finished within all constraints with the current piece}
    p=0;
  pc=P CF(p, cbp);
  return pc;
end.

The updating of the prospect structure (at P108 in FIG. 2) is described with reference to the flowchart in FIG. 4. When the item arrives (at P140), first it is determined if the item queue is full (at P142). If the queue is full, an item is popped from the queue (at P144) and the popped item is removed from the tally matrix (at P146). On the other hand, if it is determined (at P142) that the queue is not full, then the item is put in the queue (at P148) and the item combinations are added to the tally matrix (at P150).

The algorithm for adding an item to the tally matrix is as follows:

Pseudo-code #2. Adding an Item to the Tally Matrix.
  Input:
  Size of item, w
  Number of items in FIFO queue, n
  Maximum number of items in batch, max_c
  Batch size, bs
  Tally matrix, $TM_{i,j}$
  Output:
  <none> (but the Tally matrix changes).
  TallyAdd(w, n, max_c, bs, $TM_{i,j}$)

```
begin
    for j = MIN(n,max_c) down to 2 do begin
        for i = w + 1 to bs do begin
            TM_{i,j} = TM_{i,j} + TM_{(i-w),(j-1)};
        end
    end
    TM_{w,1} = TM_{w,1} + 1;
End
```

The algorithm for removing an item from the tally matrix is as follows:

Pseudo-code #3. Removing an Item From the Tally Matrix.
  Input:
  Size of item, w
  Number of items in FIFO queue, n
  Maximum number of items in batch, max_c
  Batch size, bs
  Tally matrix, $TM_{i,j}$
  Output:
  <none> (but the Tally matrix changes).
  TallyRemove(w, n, max_c, bs, $TM_{i,j}$).

```
begin
    TM_{w,1} = TM_{w,1} - 1;
    for j = 2 to MIN(n,max_c) do begin
        for i = w + 1 to bs do begin
            TM_{i,j} = TM_{i,j} - TM_{(i-w),(j-1)};
        end
    end
end
```

Pseudo-code #5. Gaussian Estimation of the Tally Matrix Multiplication. This can be plugged into both pseudo-code #1 and pseudo-code #2.
  Input:
  The batch shortage being looked up, i.
  Number of different types, T.
  Average item size for all types (vector), $\mu$.
  Standard deviation of item size for all types (vector), s.
  Desired item count of all types, c.
  Output:

An estimate of the tally matrix multiplication $$TM_{i,\hat{c}} / \left( \sum^n \hat{c} \right).$$

TallyEstimate(i, T, $\mu$, $\sigma$, c).
begin $$\sum \mu = \sum_{i=1}^{T} \mu_j$$

$$\sum s = \sum_{i=1}^{T} s_j$$

$$TE = \frac{e^{-(i-\Sigma\mu)^2/2(\Sigma s)^2}}{\sum s \sqrt{2\pi}}$$

return TE.
end
Tally Matrix Example

The following is an example of a Tally matrix for a small queue of items, and how the prospect of a batch shortage is calculated. The example also shows how the tally matrix changes when an item is removed and added to the queue.

A Sample Tally Matrix

For the following item FIFO queue (the index is also the position of that item in the queue);
Sample FIFO Queue

| Index i | 1 | 2 | 3 | 4 | 5 | 6 | 7 | 8 |
|---|---|---|---|---|---|---|---|---|
| Item ($w_i$) | 4 | 5 | 5 | 5 | 6 | 6 | 7 | 4 | the Tally matrix (for batch counts 1 to 4, and batch shortages 1 to 24) is:
Sample Tally Matrix

| | Batch counts, C | | | |
|---|---|---|---|---|
| | 1 | 2 | 3 | 4 |
| Single count probability, P(C) | $\binom{8}{1}^{-1}$ | $\binom{8}{2}^{-1}$ | $\binom{8}{3}^{-1}$ | $\binom{8}{4}^{-1}$ |
| a  1 | | | | |
| 2 | | | | |
| 3 | | | | |
| 4 | 2 | | | |
| 5 | 3 | | | |
| 6 | 2 | | | |
| 7 | 1 | | | |
| 8 | | 1 | | |
| 9 | | 6 | | |
| 10 | | 7 | | |
| 11 | | 8 | | |
| 12 | | 4 | | |
| 13 | | 2 | 3 | |
| 14 | | | 8 | |
| 15 | | | 14 | |
| 16 | | | 14 | |
| 17 | | | 10 | |
| 18 | | | 6 | 3 |
| 19 | | | 1 | 8 |
| 20 | | | | 16 |

-continued

| | Batch counts, C | | | |
|---|---|---|---|---|
| | 1 | 2 | 3 | 4 |
| Single count probability, P(C) | $\binom{8}{1}^{-1}$ | $\binom{8}{2}^{-1}$ | $\binom{8}{3}^{-1}$ | $\binom{8}{4}^{-1}$ |
| 21 | | | | 16 |
| 22 | | | | 16 |
| 23 | | | | 8 |
| 24 | | | | 3 |

The tally matrix is calculated by using the TallyAdd procedure (Pseudocode #2) eight times, once for each item in the FIFO Queue. The six (6) different count combinations corresponding to entry (9, 2) are (the subscript denotes the index of that item): $(4_1, 5_2)$, $(4_1, 5_3)$, $(4_1, 5_4)$, $(4_2, 5_2)$, $(4_2, 5_2)$, $(4_2, 5_2)$. The six (6) different count combinations corresponding to entry (18, 3) are (the subscript denotes the index of that item): $(5_2, 6_5, 7_7)$, $(5_3, 6_5, 7_7)$, $(5_4, 6_5, 7_7)$, $(5_2, 6_6, 7_7)$, $(5_3, 6_6, 7_7)$, $(5_4, 6_6, 7_7)$.

Prospect comparison examples

The following examples show how the prospect change is calculated. The calculations are based on the tally matrix above. The BFE and PCF functions are defined as follows in these examples:

result=BFE(b, c, z, min_c, max_c)

```
begin
    if( (c≧min_c) AND (c≦max#c) AND (b≦0) AND(b≧-z)) then
        result = 1;
    else
        result = 0;
    return result;
end.
```
result = PCF(p2,p1)

result=PCF(p2, p1)

```
begin
    result = p2 - p1;
    return result;
end.
```

EXAMPLE 1

Variable values:

w=5 b=11 c=2 min_c=1 max_c=5 t=2

Current batch prospect (cbp) calculation:

c0=MAX(1,min_c−c)=MAX(1, −1)=1;

c1=max_c−c=5−2=3;

$$cbp = \sum_{i=b}^{b+t} \sum_{j=c0}^{c1} BFE(b-i, c+j, t) TM_{i,j} * \binom{n}{i}^{-1}$$

$$= \sum_{i=10}^{12} \sum_{j=1}^{3} BFE(11-i, 2+j, 1) TM_{i,j} * \binom{8}{i}^{-1}$$

$$= BFE(0, 3, 2) * TM_{11,1} * \binom{8}{1}^{-1} + BFE(0, 4, 2) * TM_{11,2} * \binom{8}{2}^{-1} +$$

$$= BFE(0, 5, 2) * TM_{11,3} * \binom{8}{3}^{-1} + BFE(-1, 3, 2) * TM_{12,1} * \binom{8}{1}^{-1} +$$

$$BFE(-1, 4, 2) * TM_{12,2} * \binom{8}{2}^{-1} + BFE(-1, 5, 2) * TM_{12,3} * \binom{8}{3}^{-1} +$$

$$BFE(-2, 3, 2) * TM_{13,1} * \binom{8}{1}^{-1} + BFE(-2, 4, 2) * TM_{13,2} * \binom{8}{2}^{-1}$$

$$BFE(-2, 5, 2) * TM_{13,3} * \binom{8}{3}^{-1}$$

$$= 1*0*8^{-1} + 1*8*28^{-1} + 1*0*56^{-1} +$$

$$1*0*8^{-1} + 1*4*28^{-1} + 1*0*56^{-1} +$$

$$1*0*8^{-1} + 1*2*28^{-1} + 1*3*56^{-1}$$

$$= 14/28 + 3/56$$

$$\approx 0.55357$$

New prospect (p) calculation (with new item added):
c0=MAX(1,min_c−c−1)=MAX(1, −2)=1;
c1=max_c−c=5−2−1=2;

$$p = \sum_{i=nb}^{nb+t} \sum_{j=c0}^{c1} BFE(nb-i, c+j, t) * TM_{i,j} * \binom{n}{i}^{-1}$$

$$= \sum_{i=5}^{7} \sum_{j=1}^{2} BFE(6-i, 2+1+j, 1) * TM_{i,j} * \binom{8}{i}^{-1}$$

$$BFE(0, 4, 2) * TM_{6,1} * \binom{8}{1}^{-1} + BFE(0, 5, 2) * TM_{6,2} * \binom{8}{2}^{-1} +$$

$$= BFE(-1, 4, 2) * TM_{7,1} * \binom{8}{1}^{-1} + BFE(-1, 5, 2) * TM_{7,2} * \binom{8}{2}^{-1} +$$

$$BFE(-2, 4, 2) * TM_{8,1} * \binom{8}{1}^{-1} + BFE(-2, 5, 2) * TM_{8,2} * \binom{8}{2}^{-1}$$

$$= 1*2*8^{-1} + 1*1*28^{-1} +$$

$$1*1*8^{-1} + 1*0*28^{-1} +$$

$$1*0*8^{-1} + 1*0*28^{-1} +$$

$$= 3/8 + 1/28$$

$$\approx 0.41071$$

Prospect Comparison (pc):

$$pc = p - cbp$$

$$\approx 0.41071 - 0.55357$$

$$= -0.14286$$

EXAMPLE 2

Variable values:
w=6
b=22
c=1
min_c=5
max_c=5
t=2
Current batch prospect (cbp) calculation:
c0=MAX(1,min_c−c)=MAX(1,5−1)=4;
c1=max_c−c=5−1=4;

$$cbp = \sum_{i=b}^{b+t} \sum_{j=c0}^{c1} BFE(b-i, c+j, t) * TM_{i,j} * \binom{n}{i}^{-1}$$

$$= \sum_{i=22}^{24} \sum_{j=4}^{4} BFE(22-i, 1+j, 1) * TM_{i,j} * \binom{8}{i}^{-1}$$

$$= BFE(0, 5, 2) * TM_{22,4} * \binom{8}{4}^{-1} +$$

$$BFE(-1, 5, 2) * TM_{23,4} * \binom{8}{4}^{-1} +$$

$$BFE(-2, 5, 2) * TM_{24,4} * \binom{8}{4}^{-1}$$

$$= 1*16*70^{-1} + 1*8*70^{-1} + 1*3*70^{-1}$$

$$= 27/70$$

$$\approx 0.38571$$

New prospect (p) calculation (with new item added):
c0=MAX(1,min_c−c−1)=MAX(1,5−1−1)=3;
c1=max_c−c=5−1−1=3;
nb=b−w=22−6=16;

$$p = \sum_{i=nb}^{nb+t} \sum_{j=c0}^{c1} BFE(nb-i, c+j, t) * TM_{i,j} * \binom{n}{i}^{-1}$$

$$= \sum_{i=16}^{18} \sum_{j=3}^{3} BFE(16-i, 1+1+j, 1) * TM_{i,j} * \binom{8}{i}^{-1}$$

$$= BFE(0, 5, 2) * TM_{16,3} * \binom{8}{3}^{-1} +$$

$$BFE(-1, 5, 2) * TM_{17,3} * \binom{8}{3}^{-1} +$$

$$BFE(-2, 5, 2) * TM_{18,3} * \binom{8}{3}^{-1}$$

$$= 1*14*\binom{8}{3}^{-1} + 1*10*\binom{8}{3}^{-1} + 1*6*\binom{8}{3}^{-1}$$

$$= 30/56$$

$$\approx 0.53571$$

Prospect comparison (pc):

$$pc = p - cbp$$

$$\approx 0.53571 - 0.38571$$

$$= 0.15000$$

Tally Matrix Update Example

The following example shows how the Tally (in the example above) changes when an item is dropped from the FIFO Queue, and a new item is added to it.

DROPPING THE FIRST ITEM FROM THE FIFO QUEUE

After the first item has been dropped from the queue, the FIFO Queue is:

Sample FIFO Queue

| Index i | 1 | 2 | 3 | 4 | 5 | 6 | 7 |
|---|---|---|---|---|---|---|---|
| Item ($w_i$) | 5 | 5 | 5 | 6 | 6 | 7 | 4 | and the Tally matrix (for batch counts 1 to 4, and batch shortages 1 to 24) is:

| | | Batch counts, C | | | |
|---|---|---|---|---|---|
| | | 1 | 2 | 3 | 4 |
| Single count robability, P(C) | | $\binom{7}{1}^{-1}$ | $\binom{7}{2}^{-1}$ | $\binom{7}{3}^{-1}$ | $\binom{7}{4}^{-1}$ |
| Batch shortages, B | 1 | | | | |
| | 2 | | | | |
| | 3 | | | | |
| | 4 | 1 | | | |
| | 5 | 3 | | | |
| | 6 | 2 | | | |
| | 7 | 1 | | | |
| | 8 | | | | |
| | 9 | | 3 | | |
| | 10 | | 5 | | |
| | 11 | | 7 | | |
| | 12 | | 4 | | |
| | 13 | | 2 | | |
| | 14 | | | 3 | |
| | 15 | | | 7 | |
| | 16 | | | 10 | |
| | 17 | | | 8 | |
| | 18 | | | 6 | |
| | 19 | | | 1 | 1 |
| | 20 | | | | 6 |
| | 21 | | | | 8 |
| | 22 | | | | 10 |
| | 23 | | | | 7 |
| | 24 | | | | 3 |

ADDING A NEW ITEM TO THE FIFO QUEUE

After item of size 5 has been added to the FIFO Queue, the FIFO Queue is:

Sample FIFO Queue

| Index i | 1 | 2 | 3 | 4 | 5 | 6 | 7 | 8 |
|---|---|---|---|---|---|---|---|---|
| Item ($w_i$) | 5 | 5 | 5 | 6 | 6 | 7 | 4 | 5 | and the Tally matrix (for batch counts 1 to 4, and batch shortages 1 to 24) is:

Sample Tally Matrix

| | | Batch counts, C | | | |
|---|---|---|---|---|---|
| | | 1 | 2 | 3 | 4 |
| Single count robability, P(C) | | $\binom{8}{1}^{-1}$ | $\binom{8}{2}^{-1}$ | $\binom{8}{3}^{-1}$ | $\binom{8}{4}^{-1}$ |
| Batch shortages P(C) | 1 | | | | |
| | 2 | | | | |
| | 3 | | | | |
| | 4 | 1 | | | |
| | 5 | 4 | | | |
| | 6 | 2 | | | |
| | 7 | 1 | | | |
| | 8 | | | | |
| | 9 | | 4 | | |
| | 10 | | 8 | | |
| | 11 | | 9 | | |
| | 12 | | 5 | | |
| | 13 | | 2 | | |
| | 14 | | | 6 | |
| | 15 | | | 12 | |
| | 16 | | | 17 | |
| | 17 | | | 12 | |
| | 18 | | | 8 | |
| | 19 | | | 1 | 4 |
| | 20 | | | | 13 |
| | 21 | | | | 18 |
| | 22 | | | | 18 |
| | 23 | | | | 13 |
| | 24 | | | | 4 |

While the invention has been described with reference to particular mechanisms (algorithms, processes, functions and the like) and architectures, one skilled in the art would realize that other mechanisms and/or architectures could be used while still achieving the invention.

The algorithms, processes, mechanisms and methods according to the present invention can be implemented in software, hardware or a combination thereof. When implemented fully or partially in software, the invention can reside, permanently or temporarily, on any memory or storage medium, including but not limited to a RAM, a ROM, a disk, an ASIC, a PROM and the like.

Further, while many of the operations described herein have been shown as being performed in a particular order, one skilled in the art would realize that other orders, including some parallelization of operations, are possible and are considered to be within the scope of the invention.

While the present invention has been described with reference to batching in a particular context, the methods, systems and devices of this invention are considered to be general constructs covering other, batching contexts and, in general, to any context in which on-line bin packing takes place.

Thus, are provided methods, systems and devices for batching of objects. One skilled in the art will appreciate that the present invention can be practiced by other than the described embodiments, which are presented for purposes of illustration and not limitation, and the present invention is limited only by the claims that follow.

What is claimed:

1. A method for generating a prospect for filling a batch with at least one item having at least one characteristic property, the prospect being used to assigning an item to a batch having at least one batch shortage expressed in terms of the at least one characteristic property, method comprising:

providing a first set of data representing at least one characteristic property of at least one item;

providing a second set of data representing at least one batch shortage;

generating a third set of data representing a tally on the number of combinations of the items represented in the first set of data as a function of batch shortage and item count;

providing a fourth set of data indicating at least one batch shortage and optionally a maximum number of items on which the prospect generation is to be based;

generating the prospect related to the fourth set of data on the basis of multiplying each of the entries of the third set of data by the single count probability corresponding to each entry subject to the proviso that each of the entries multiplied represents:
  (i) one of the batch shortages indicated in the fourth set of data, and
  (ii) a number of combinations of items being smaller than or equal to the provided maximum number of items.

2. A method for generating a prospect according to claim 1, wherein the batch shortage for providing the fourth set of data is provided by test-fitting an item into a selected batch.

3. A method for generating a prospect according to claim 1 or 2, wherein at least one entry of the first set of data is removed and/or at least one entry is added to the first set of data when an item has been applied in a process of assigning an item to a batch of items.

4. A method for generating a prospect according to claim 3, wherein the tally is updated when an entry has been removed and/or added to the first set of data.

5. A method for generating a prospect according to claim 3, wherein the tally is updated occasionally, preferably after a predetermined number of entries have been removed and/or added to the first set of data.

6. A method for generating a prospect for filling a batch according to claim 1, wherein the first set of data is organized as a first in first out queue of entries, the queue has accordingly a first and a last entry and the last entry of this queue represents an item most recently applied in a process of assigning an item to a batch of items.

7. A method for generating a prospect according to claim 1, wherein the number of entries of the first set of data is selected so that fluctuations in the prospect due to removal and/or addition of entries to the first set of data is lower than a predetermined limit and so that the prospect will be able to follow a general change in population of items.

8. A method for generating a prospect for filling a batch according to claim 1, wherein the number of entries of the first set of data is larger than 50, preferably larger than 100, even more preferably larger than 150, and in some situations preferably larger than 200.

9. A method for generating a prospect for filling a batch according to claim 1, wherein the third set of data is updated substantially each time an item is assigned to a batch.

10. A method for generating a prospect for filling a batch according to claim 1, wherein one entry of the first set of data is removed and one entry is added to the first set of data substantially each time an item is assigned to a batch.

11. A method for generating a prospect for filling a batch according to claim 10, wherein the third set of data is updated occasionally such as periodically and preferably each time a change such as a substantial change in the distribution of characteristic properties of the items represented in the first set of data occur.

12. A method for generating a prospect for filling a batch according to claim 1, wherein the method further comprises:

comparing at different instants the distribution of characteristic properties of the items represented in the first set of data.

13. A method for generating a prospect for filling a batch according to claim 1, wherein no new entries are added to and/or removed from the first set of data when an item is assigned to a batch.

14. A method for assigning a selected item to a batch applying the prospect generation method according to claim 1, comprising:
  (a) selecting a batch and providing a first batch shortage for the selected batch;
  (b) generating a first prospect for the selected batch on the basis of the first batch shortage;
  (c) test-fitting the selected item into the selected batch;
  (d) calculating a second batch shortage for the selected batch on the basis of the test-fitting;
  (e) generating a second prospect for the selected batch on the basis of the second batch shortage;
  (f) generating a change of prospect for the selected batch based on the first and the second prospect; and
  (g) optionally selecting another batch and repeating processing (b) through (f) until no further batches are to be selected,
  (h) assigning, on the basis of the prospect change generated for each selected batch by the processing (a) through (f), the selected item to a batch fulfilling a predetermined first probability criterion if such a batch exist among each of the selected batch.

15. A method for assigning a selected item to a batch according to claim 14, wherein the predetermined first probability criterion is the prospect change having the highest probability among the generated prospects.

16. A method for assigning a selected item to a batch according to claim 14 or 15, further comprising a secondary assigning method applied when the selected item is not assigned to a batch on the basis of the first probability criterion.

17. A method for assigning a selected item to a batch according to claim 16, wherein the secondary assigning method comprises selecting either a batch to which the item is assigned or leave the item without being assigned to a batch.

18. A method for assigning a selected item to a batch according to claim 17, wherein the batch to which the selected item is assigned by the secondary assigning method is selected on the basis of the time passed since an item was assigned to the batch.

19. A method for assigning a selected item to a batch according to claim 17, wherein the batch to which the selected item is assigned by the secondary assigning method is selected on the basis of the batch characteristic being the outcome of the assignment.

20. A method for assigning a selected item to a batch according claim 14, wherein the selected item is selected from a stream of object being conveyed from a first position to a second position.

21. A method for assigning a selected item to a batch according to claim 20, wherein the second position is either a batch position or a rejection position.

22. An apparatus for assigning an item to a batch or a rejection position, wherein the assignment takes place in process where a stream of items is conveyed from a first position to a second position being either a batch or a rejection position, the apparatus comprising:
  (A) a control unit programmed to perform a method for assigning a selected item to a batch, the programmed method comprising:
    (a) selecting a batch and providing a first batch shortage for the selected batch;

(b) generating a first prospect for the selected batch on the basis of the first batch shortage;
(c) test-fitting the selected item into the selected batch;
(d) calculating a second batch shortage for the selected batch on the basis of the test-fitting;
(e) generating a second prospect for the selected batch on the basis of the second batch shortage;
(f) generating a change of prospect for the selected batch based on the first and the second prospect; and
(g) optionally selecting another batch and repeating processing (b) through (f) until no further batches are to be selected,
(h) assigning, on the basis of the prospect change generated for each selected batch by the processing (a) through (f), the selected item to a batch fulfilling a predetermined first probability criterion if such a batch exist among each of the selected batch;

(B) means for determining the characteristic property/properties of the item to be assigned;

(C) means for selecting either a batch or a rejection position; and (D) means for conveying/moving the item to either the selected batch or the rejection position.

* * * * *